Jan. 23, 1923.

W. R. GILBERT.
JUICE EXTRACTOR.
FILED JUNE 14, 1921.

W. R. Gilbert
INVENTOR

BY  Victor J. Evans
ATTORNEY

WITNESSES

Patented Jan. 23, 1923.

1,443,255

UNITED STATES PATENT OFFICE.

WILLIAM R. GILBERT, OF TUSCALOOSA, ALABAMA.

JUICE EXTRACTOR.

Application filed June 14, 1921. Serial No. 477,539.

*To all whom it may concern:*

Be it known that I, WILLIAM R. GILBERT, a citizen of the United States, residing at Tuscaloosa, in the county of Tuscaloosa and State of Alabama, have invented new and useful Improvements in Juice Extractors, of which the following is a specification.

This invention relates to a juice extractor, the general object of the invention being to provide a device for extracting the juice from a slice of fruit where only a small quantity of juice is desired.

My invention is mainly designed for pressing the juice from a slice of lemon for use in a glass of ice tea, or on fish and meats though it will of course be understood that the invention can be used for other purposes.

Another object of the invention is to so form the parts that only the pulp part will be subjected to the pressing action so that the juice from the rind or skin will not be extracted.

A still further object of the invention is to provide a holder for the device to prevent staining of the tablecloth.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a sectional view showing how the device is used.

Figure 2 is a plan view of the cup.

Figure 3 is a bottom plan of the presser.

Figure 4 is a plan of the holder.

In these views 1 indicates the cup which is provided with a concaved corrugated bottom, as shown at 2, and a centrally located hole 3 in its bottom from which the inclined grooves formed by the corrugations converge. 4 represents the presser which comprises the reduced part 5 having the convex bottom 6, the enlarged part 7 which forms a flange at the upper part 5 and the handle 8 which projects upwardly from part 7.

The flange formed by part 7 acts to center the presser part 5 in the cup so that this presser part will engage the pulp of the slice of fruit, shown at A in Figure 1, and not the rind part so that the juice from the rind part will not be extracted. It will be seen that when the parts are placed in the position shown in Figure 1 and pressure is applied upon member 4 the pure juice from the pulp part of the slice will be extracted and this juice running down the grooves formed in the corrugated bottom will pass through the hole 3 into a receptacle, such as a glass of ice tea, or on fish and meats. The part 4 may be withdrawn from the cup by means of the handle 8.

A saucer or holder 9 is provided for holding the device so as to prevent staining of the tablecloth.

As before stated, the device is mainly designed for pressing the juice from a slice of lemon into a glass of ice tea or a cup of hot tea so that it is not necessary to use the fingers for pressing the juice from the slice as is now done. It will of course be understood, however, that I do not wish to be limited to this use of the device.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the character described comprising a cup having an opening centrally arranged in its bottom, said bottom being concaved and provided with a plurality of inclined grooves designed to converge toward the opening, a presser provided with a convex bottom and adapted to be associated with the converging grooves of the concaved bottom of the cup, a handle formed on the upper surface of the presser and a flange projecting beyond the side edges of the bottom of the presser for the purpose specified.

In testimony whereof I affix my signature.

WILLIAM R. GILBERT.